United States Patent [19]

Clark

[11] 4,422,609
[45] Dec. 27, 1983

[54] CLAMP-MOUNT DEVICE

[75] Inventor: Keith H. Clark, Decatur, Ala.

[73] Assignee: The United States of America as represented by the Administrator of the National Aeronautics and Space Administration, Washington, D.C.

[21] Appl. No.: 293,414

[22] Filed: Aug. 14, 1981

[51] Int. Cl.³ .......................... A47B 96/06; E04G 3/00
[52] U.S. Cl. .................................................... 248/228
[58] Field of Search .............. 248/228, 317, 72, 222.1; 52/27, 39, 483; 403/316, 317

[56] References Cited

U.S. PATENT DOCUMENTS

| | | | |
|---|---|---|---|
| 2,868,490 | 1/1959 | Price | 248/228 |
| 3,003,735 | 10/1961 | Havener | 248/228 |
| 3,018,080 | 1/1962 | Loudon | 248/228 |
| 4,112,550 | 9/1978 | De Witt et al. | 248/228 |
| 4,191,352 | 3/1980 | Schuplin | 248/317 |

Primary Examiner—William H. Schultz
Assistant Examiner—Ramon O. Ramirez
Attorney, Agent, or Firm—Joseph H. Beumer; John R. Manning; Leon D. Wofford, Jr.

[57] ABSTRACT

A clamp-mount device is disclosed for mounting equipment B to an associated I-beam 50 and the like structural member of the type having oppositely extending flanges 52, 54 wherein the device comprises a base 10 and a pair of oppositely facing clamping members 12, 14 carried diagonally on the base clamping flanges therebetween and having flange receiving openings facing one another. Lock means 20, 22 are carried diagonally by the base opposite the clamping members locking the flanges in the clamping members. A resilient hub 30 is carried centrally of the base engaging and biasing a back side of the flanges maintaining same tightly clamped and facilitating use on vertical as well as horizontal members. The base turns about the hub to receive the flanges within the clamping members. Equipment B may be secured to said base 10 by any suitable means such as bolts in openings 10b. Slidable gate latches 24, 26 secure the hinged locks 20, 22 in an upright locking position. The resilient hub includes a recess opening 34 formed in base 10 and a rubber-like pad 32 carried in this opening being depressably and rotatably carried therein.

7 Claims, 4 Drawing Figures

CLAMP-MOUNT DEVICE

ORIGIN OF THE INVENTION

The invention described herein was made by an employee of the United States Government and may be manufactured and used by or for the Government for governmental purposes without the payment of any royalty thereon or therefor.

BACKGROUND OF THE INVENTION

The purpose of this invention is to provide a clamp mounting device, for quickly attaching to or removing from a support member, such as an I-beam instrumentation and/or equipment without the use of tools or any significant force.

Prior devices used are C-clamps, bolts, or very strong spring clips. Disadvantages of prior devices are that C-clamps are cumbersome and require more time and considerable force to install. Bolts require the drilling of holes and hand tools. Strong spring clips require significant force to be put in place and do not provide a positive fail-safe mounting and clamping device.

Flange clips are known such as the type in U.S. Pat. Nos. 4,191,352 and 3,003,735, however, these simplified devices are not satisfactory for mounting heavy instrumentation and equipment and may be accidentally disengaged.

Accordingly, an important object of the present invention is to provide a device for quickly mounting to or removing from a support member such as an "I" beam without the use of tools or any significant force.

Yet another important object of the present invention is to provide a clamp and mounting device for mounting various equipment to "I" beams and the like which may be used on vertical as well as horizontal support members.

Still another important object of the present invention is to provide a clamp and mounting device which includes a safety lock once the device is mounted to a structure which will prevent it from being accidentically disengaged.

SUMMARY OF THE INVENTION

The above objects are accomplished according to the present invention by means of a device having a pair of oppositely facing clamps which engage the flange of an "I" beam and a pair of pivotable locking members which engage the opposing edge of the flange of the "I" beam which pivot in and out of place and may be locked in a locking position. A pressure pad is utilized to place pressure on a bottom web of the flange of the "I" beam and the like structural member when the device is used on a vertical member. Equipment or instrumentation may be affixed to the opposing side of the device by any suitable arrangement such as bolts.

BRIEF DESCRIPTION OF THE DRAWINGS

The construction designed to carry out the invention will be hereinafter described together with other features thereof.

The invention will be more readily understood from a reading of the following specification and by reference to the accompanying drawings forming part thereof, wherein an example of the invention is shown and wherein.

DESCRIPTION OF A PREFERRED EMBODIMENT

Figure 1:
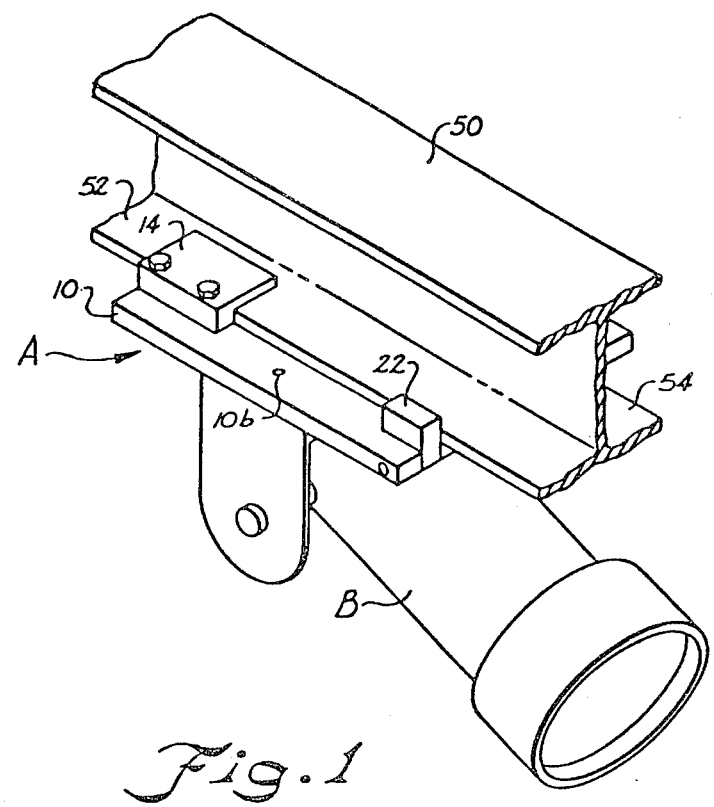
FIG. 1 is a perspective view illustrating a mounting clamp device according to the invention mounting an associated camera to an "I" beam.
Figure 4:
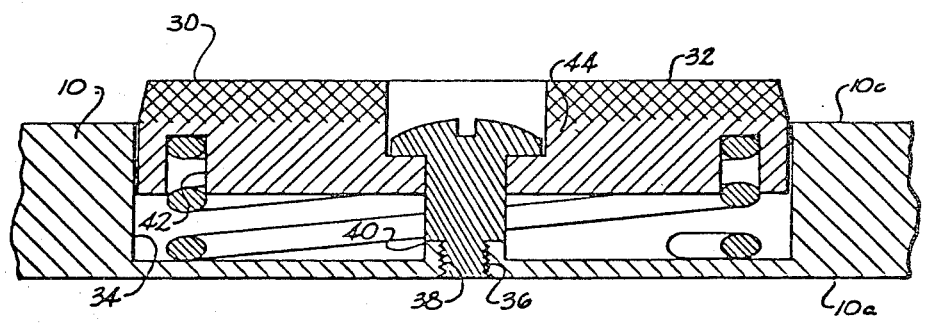
FIG. 4 is a sectional view taken through the pressure pad of the device of FIG. 2.

A clamp-mount device, designated generally at A, is disclosed for mounting instrumentation or equipment B, for example, a spot light or TV scanning camera, to an associated structure. The device includes a mounting face 10a and a clamping face 10c.

Referring in detail to the drawings, the clamp and mounting device A constructed according to the present invention, is illustrated as including a base plate 10 having clamping means in the form of a pair of oppositely facing clamping members 12 and 14 carried on diagonal corners and affixed thereto by means of bolts 16. The clamping members each include a base portion such as at 12a, 14a between which a resilient means in the form of rubber pad 18 is carried to give some degree of resiliency to the clamp which thus can impart a resilient clamping force. Extending from the base 12a is a clamping face 12b which is spaced above the plate 10 sufficiently to engage a structural member to which the device is attached such as a flange of an "I" beam.

Figure 2:
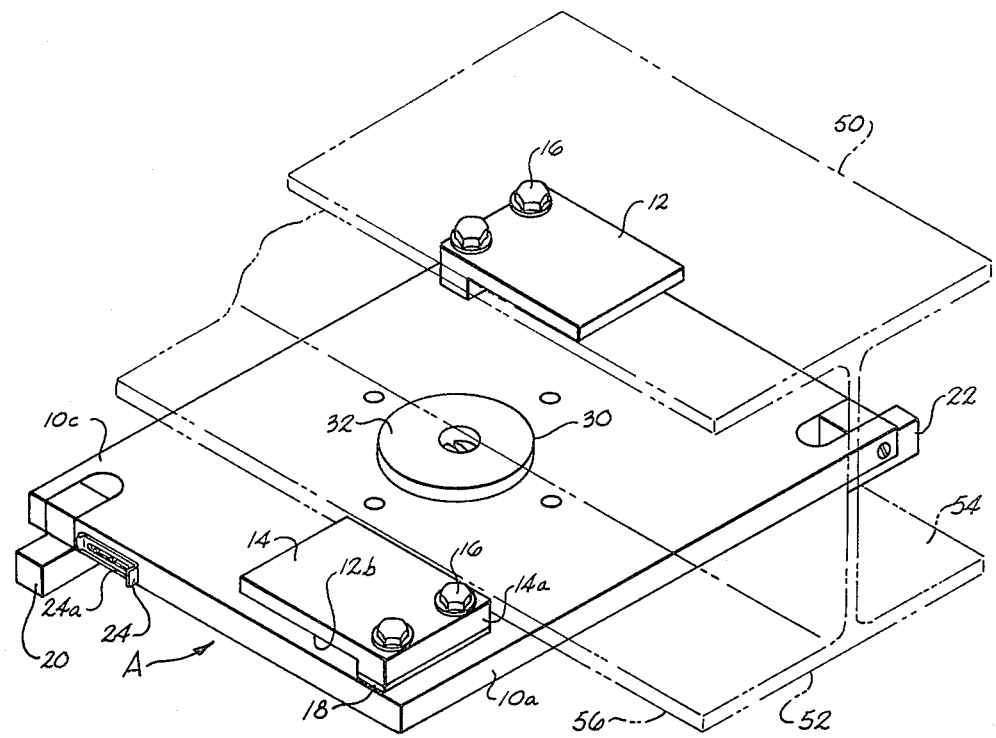
FIG. 2 is a perspective view illustrating a clamp and mounting device constructed according to the present invention in position prior to being clamped to an "I" beam.

Lock means is provided by safety locks 20 and 22 carried on the remaining diagonal corners of the clamping plate and are hinged so as to pivot out of the way as best seen in FIG. 2. Latch means 24 is carried on the side of plate 10 in the form of a sliding gate for locking the safety lock 20 in its locking position as shown in FIG. 1 and a similar latch 26 is carried on a side plate 10 for latching the safety lock 22 in its locking position. Each latch includes slots 24a, 26a by which the gates slide on brads.

Located medially of the plate 10 is a resilient hub means 30 which is illustrated as including a circular rubber pressure pad 32 which is received in a recess 34 and rotatably affixed to the plate by means of a threaded screw at 36. Such provides a biasing means for biasing the clamp and structural member tightly together. Body screw 36 is received in a threaded opening 38 which is formed in a hub 40 formed in the recess 34 which is machined in the plate 10. A spring is carried between the bottom of recess 34 and is received in a groove 42 of the pressure pad 30 so as to urge it upwardly to provide a biasing force against the bottom of the member to which the device is attached. As illustrated, pressure pad 30 includes the rubber pad 32 which is carried on a circular metal plate 34 in which the groove 42 is machined. The rubber pad may be affixed thereto by any suitable means such as cementing. The pressure pad is important in allowing the clamp and mounting device to be attached to a vertical member as it exerts enough force against the member and enough friction to prevent the device from slipping. This is also an expedient in providing a tight clamp on a horizontal movement.

Figure 3:
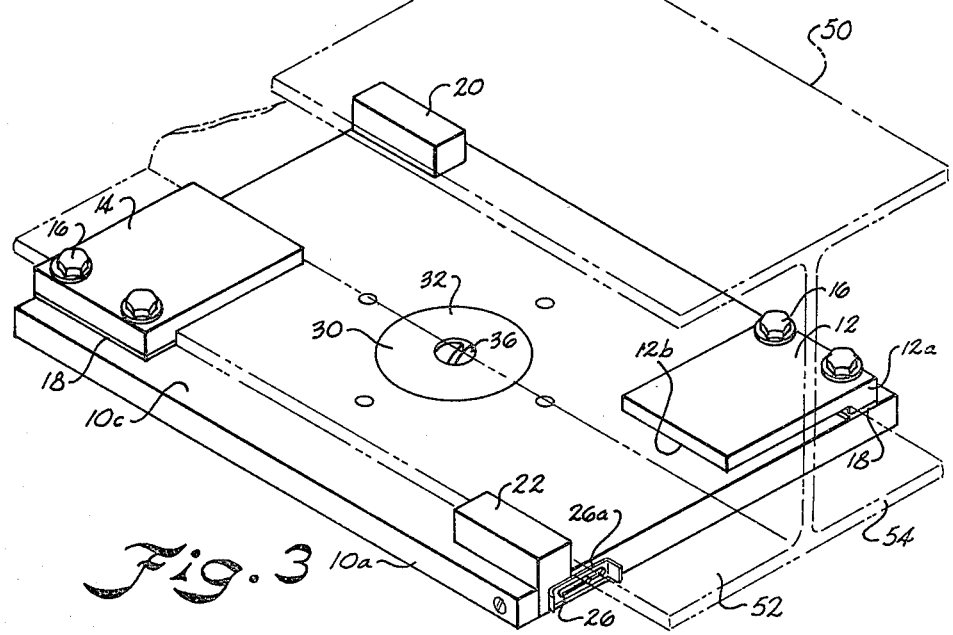
FIG. 3 is a perspective view of the device of FIG. 2 attached to the "I" beam of FIG. 2.

In operation, the clamp device A is placed against the structural member to which it is to be attached such as the "I" beam in FIG. 2 designated as 50. Pressure pad 30 is depressed. The device A is then rotated to the position of FIG. 3 such that one leg 52 of the flange of the "I" beam is received under clamp member 14 and the opposing leg 54 of the flange is received under clamping member 12 with the safety locks in their release position as shown in FIG. 2. Pressure pad 32 bears against a back side or web 56 of flanges 52, 54 tightly clamping the device on I-beam 50. Thereafter, the safety locks are pivoted up to their locking position as shown in FIG. 1 whereupon the latches 24 and 26 are slid behind the safety locks to prevent them from releasing. In this manner, a stable and secure mounting and clamp device is provided which will stay attached to either a horizontal or vertical member. The instrumentation or equipment B which is desired to be mounted to the structural member is attached to the opposite face 10a of the base plate 10 by any suitable means such as bolts (not shown) extended through openings 10b in the base plate.

While a preferred embodiment of the invention has been described using specific terms, such description is for illustrative purposes only, and it is to be understood that changes and variations may be made without departing from the spirit or scope of the following claims.

What is claimed is:

1. A clamp-mount device for mounting equipment to an associated I-beam and the like structural member of the type having oppositely extending flanges, said device comprising:
    a base;
    a pair of oppositely facing clamping members carried diagonally on said base clamping said flange therebetween and having flange receiving openings facing one another;
    lock means carried diagonally by said base opposite said clamping members locking said flanges in said clamping members;
    resilient hub means carried centrally of said base engaging and biasing a back side of said flanges maintaining same tightly clamped, said base turning about said hub means to receive said flanges within said clamping members; and
    means securing said equipment to said base.

2. The device of claim 1 including resilient means carried between each said clamping member and said base.

3. The device of claim 1 wherein said lock means includes locks pivotably carried by said base and slidable latch means for securing said hinged locks in an upright locking position.

4. The device of claim 1 wherein said resilient hub means includes a recess opening formed in said base, and a rubber-like pad carried in said opening being depressably and rotatably carried therein.

5. The device of claim 4 including biasing means urging said pad upwardly.

6. The device of claim 1 wherein each said clamping member includes a base portion, a resilient pad carried between said base portion and said base, and a flange portion carried by said base portion extending outwardly overlying said base.

7. A clamp mount device for mounting equipment to an associated I-beam and the like structural members having oppositely extending flanges, said device comprising:
    base means;
    clamping means carried by said base means engaging said flanges;
    lock means carried by said base means locking said flanges in said clamping means;
    resilient means carried by said base means exerting pressure against a back side of said flanges maintaing same tightly clamped so that said device remains tightly clamped whether on a horizontal or vertical structure member; and
    means securing said equipment to said base means.

* * * * *